Nov. 8, 1932.   S. H. PRIESTMAN   1,887,465
GRAB BUCKET
Filed July 31, 1930   6 Sheets-Sheet 1

Nov. 8, 1932.  S. H. PRIESTMAN  1,887,465
GRAB BUCKET
Filed July 31, 1930   6 Sheets-Sheet 3

Fig. 6.

INVENTOR
Sidney Herbert Priestman,
BY
Assoc. ATTORNEY

Nov. 8, 1932.　　S. H. PRIESTMAN　　1,887,465
GRAB BUCKET
Filed July 31, 1930　　6 Sheets-Sheet 4

Nov. 8, 1932.  S. H. PRIESTMAN  1,887,465
GRAB BUCKET
Filed July 31, 1930  6 Sheets-Sheet 5

Patented Nov. 8, 1932

1,887,465

UNITED STATES PATENT OFFICE

SYDNEY HERBERT PRIESTMAN, OF HULL, ENGLAND

GRAB BUCKET

Application filed July 31, 1930, Serial No. 472,067, and in Great Britain August 20, 1929.

This invention relates to grab buckets of the kind in which the jaws are pivotally connected to a link system which enables them to be moved towards and away from one another so as to pick up a load and discharge it. In grab buckets of this kind hitherto proposed the jaws have been permanently connected to constitute part of the link system whereby their angular movement was definitely constrained at all times.

If it is desired to construct the link system in such a way that the jaws change their angular position only slightly during their movement towards and away from one another difficulty is experienced in that the load is not readily discharged from the jaws when they are separated from one another, and it is an important object of the present invention to avoid this difficulty by providing means whereby the jaws may be allowed to swing freely downwards under the influence of gravity acting upon them and upon the load contained in them whereby the load is completely and rapidly discharged.

A further object of the invention is to provide an arrangement whereby tension in the closing ropes of the grab tends to swing the jaws upwards into their load-retaining positions.

Another object of the invention is to provide a linkage which normally constrains the angular movement of the jaws as in known grabs but which can be uncoupled when desired so as to permit the aforesaid swinging down of the jaws and is automatically recoupled when the jaws are moved back into load-retaining position.

Referring to the accompanying drawings.

Figure 1:
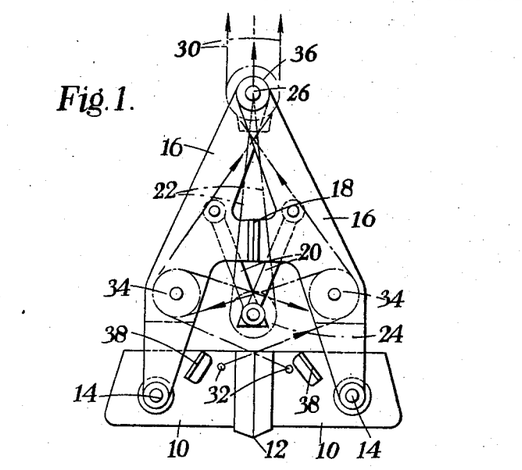
Figures 1 and 2 are diagrammatic side elevations of a grab according to this invention, in the closed and the open positions respectively.
Figure 2:
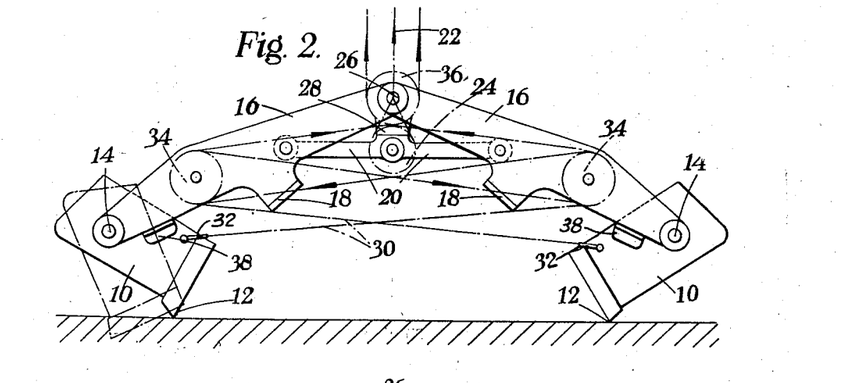

Referring to Figures 1 and 2, which illustrate diagrammatically a simple form of the invention, two bucket-jaws 10 are so shaped that when closed together they constitute a substantially rectangular bucket with a flat bottom except that their digging edges 12 slope downwardly towards one another. They are pivoted at 14, on the sides of their centres of gravity remote from their meeting edges, between the forked lower ends of two arms 16 hinged together at their upper ends. The arms are provided with stops 18 which meet together when the jaws 10 meet.

The arms 16 are connected together by a pair of toggle links 20 which converge downwardly towards one another when the jaws are closed and are straightened when the jaws are spread apart. The holding—or opening—rope 22 is passed round a pulley 24 mounted on the middle joint of the toggle links and attached to the hinge pin 26 on which the arms are hinged. When tension is applied to this rope by the weight of the grab being supported thereon the toggle links straighten against a stop 28 and thereby spread the arms widely apart as shown in Figure 2.

Two closing—and hoisting—ropes 30 are attached, one rope to each jaw, by means of a bail-bar 32 extending across the jaw and pivoted thereto near the top corners of the open inner end of the jaw. Each rope passes round a pulley 34 on the opposite arm, placed at such a level that the ropes pull upwardly and inwardly on the jaws, and then round a pulley 36 on the hinge pin 26 which constitutes the grab-head. Tension applied to these ropes will pull the jaws towards one another and when the jaws are closed and the whole weight of the grab together with the load in the bucket is taken by the hoisting ropes, they will maintain the jaws tightly pressed together. It will be apparent that as soon as the tension in the hoisting ropes is relieved the jaws will swing downwards at one in relation to the arms to discharge the load, the arms moving apart only far enough to allow the upper inner edges of the jaws to clear one another.

Stops 38 are fixed to the sides of the jaws in such a position that they engage the inner edges of the arms 16 when the jaws are separated to their greatest extent, with the jaws at their most efficient digging angle. The pull in the hoisting ropes 30 will maintain the stops in contact with the arms until the bottoms of the jaws touch the ground along their whole length, after which the arms move away from the stops and the jaws complete their closing movement in a substantially horizontal position. Thus the depth of the cut is substantially constant throughout and there is no tendency for the production of bowl-like cavities.

Figure 3:
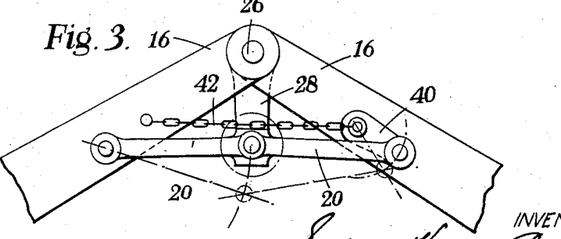
Figure 3 is a detail view.

One of the toggle links 20 may be jointed, not directly to the arm but to a short lever 40 pivoted to the arm, as shown in Figure 3, the extent to which the arms can separate being limited by a chain 42 which is of such a length that when it is tensioned the link 20 and the lever 40 make an acute angle with one another. When the tension in the holding—or opening—rope is relieved this lever ensures that the toggle links will fall under their own weight, thereby avoiding any possibility of the toggle remaining unbroken and thereby preventing the jaws from being closed. As an alternative, one of the toggle links may be slotted to engage its pivot pin on the arm, for the same purpose.

In the modified forms of the invention now to be described, a more positive control of the angle between the jaws and the arms is secured.

Figure 4:
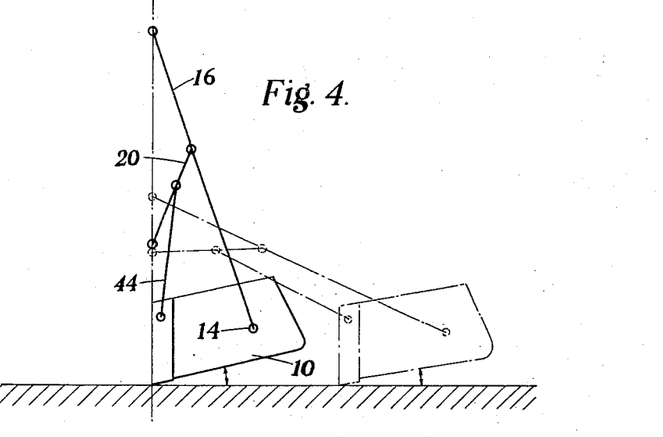
Figures 4 and 5 are diagrammatic views of two modified forms of grab according to this invention.

Referring to Figure 4, which diagrammatically illustrates one modified form, the jaws 10 are pivoted to arms 16 linked together by toggle links as before, but in addition each jaw 10 is connected to the corresponding toggle link by a constraining link 44.

Figure 5:
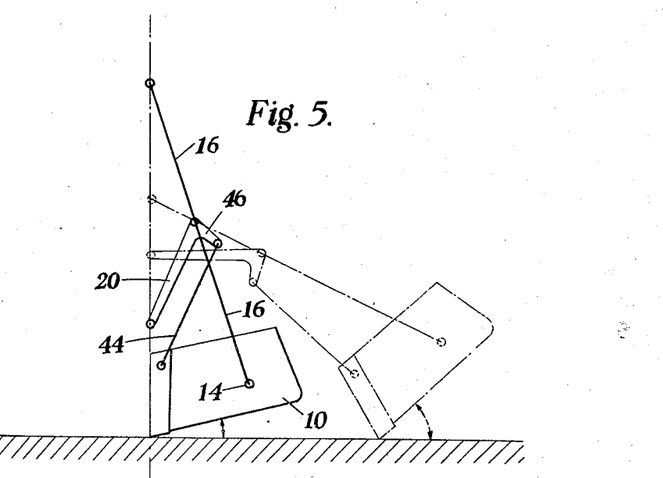

In the modification shown in Figure 5, the constraining links 44 are pivoted at their upper ends to extensions 46 of the toggle links 20, which in fact become bell-cranks by the addition of the extensions. Thus the tilt of the jaws increases rapidly as the arms 16 widen out, instead of remaining constant as in Figure 4. In Figures 6 to 12 of the drawings, in which the means for disconnecting the links 44 at their upper ends is shown, the linkage is such as to produce a tilting movement of the jaws decidedly less than that obtained in the construction shown in Figure 5.

Figure 6:
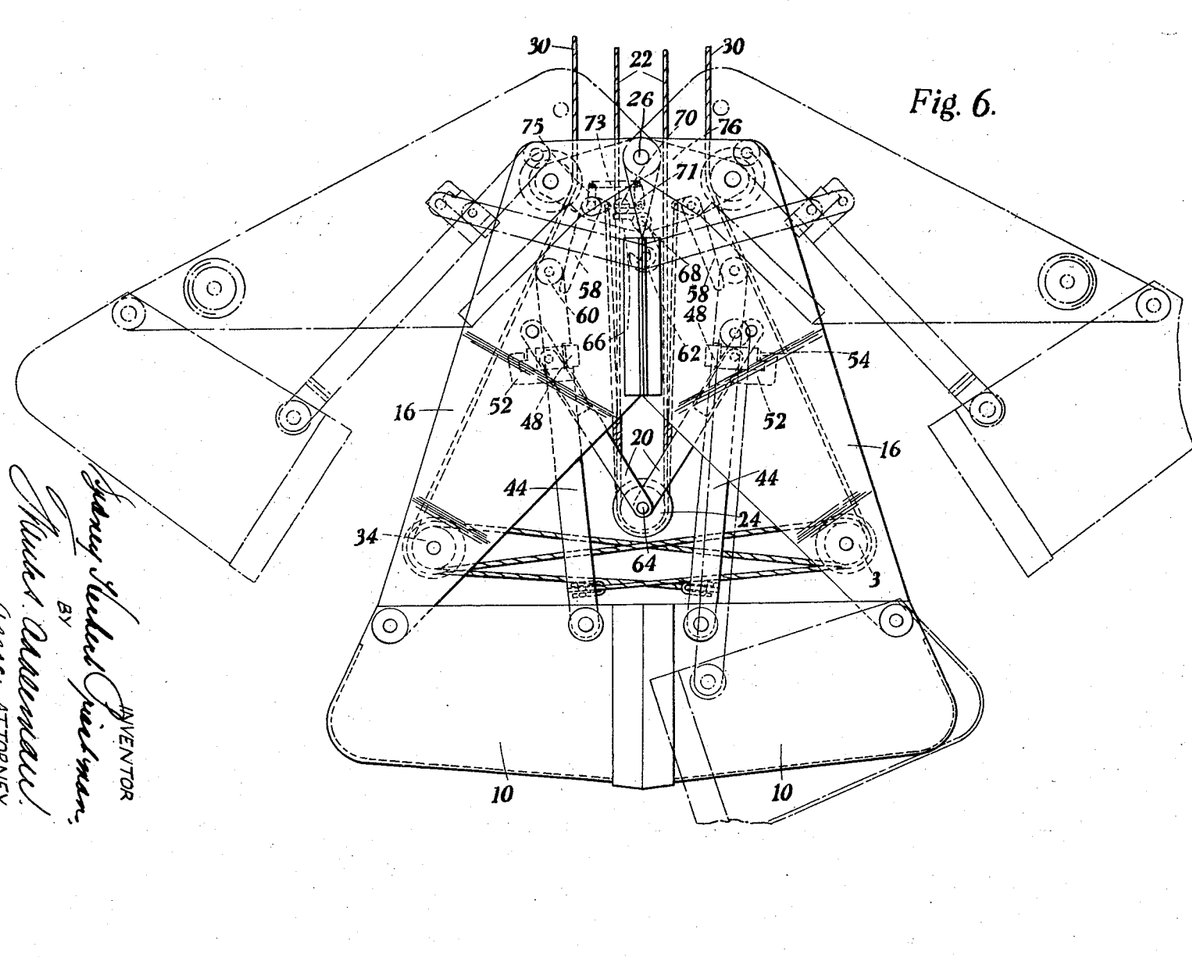
Figure 6 is a side elevation of a grab embodying further features of the invention.
Figure 7:
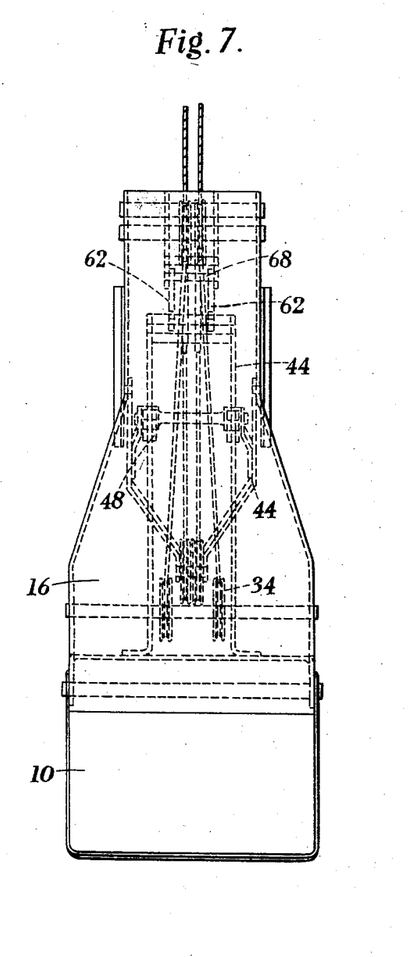
Figure 7 is an end elevation thereof.
Figure 8:
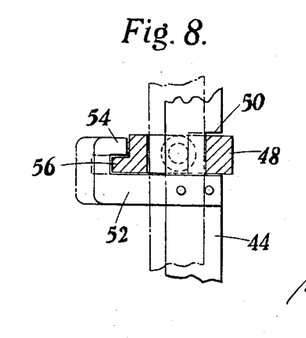
Figures 8 and 9 are detail views.
Figure 9:
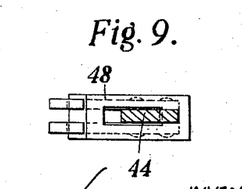

In Figures 6 and 7 the parts already described with reference to Figures 1 and 2 have the same reference numerals as in those figures. The constraining links 44, however, are not permanently pivoted to the toggle links 20 but are capable of being disconnected therefrom. A stirrup 48 is pivoted to each toggle arm and the corresponding constraining link slides freely through the stirrup. The inner edge of the link 44 is formed with a notch 50 which is in such a position that it fits over the inner part of the stirrup (see Figure 8) when the jaws are in the closed position. The links 44 also carry plates 52 projecting outwardly therefrom and having undercut latch-like ends 54 which rest on ledges 56 on the stirrups 48 when the links 44 are in the positions shown in full lines in Figures 6 and 8. The closing-and-hoisting ropes 30 are attached not to the buckets as hitherto but to the constraining links 44 near their lower ends, and each is led over a pulley 34 on the opposite arm. Thus tension in these ropes not only pulls the jaws together but also maintains the notches 50 in the constraining links in engagement with the stirrups.

In order to abolish the constraint exercised by the constraining links 44 it is only necessary to press these links outwardly sufficiently far to disengage the notches from the stirrups and the latches 54 from the ledges 56, whereupon the links are free to slide through the stirrups, until arrested by stops, under the weight of the jaws swinging down to discharge the load as shown in dotted lines in the lower part of Figure 6. The pressing outwards of the links is effected by tension in the opening or holding ropes 22. These ropes are passed round pulleys 24 at the centre joint of the toggle links as in Figures 1 and 2, but instead of being attached to the head 76 of the grab they are secured to the inner free ends of the horizontal arms of two bell-cranks 58 pivoted to the head. The other arms of these bell-cranks extend downwards and engage the inner sides of rollers 60 journalled on the constraining links at the upper ends thereof. As will readily be apparent, tension in the opening or holding ropes 22 will pull the horizontal arms of the bell-cranks 58 downwards, thus spreading the lower ends of their downwardly-extending arms and forcing the constraining links apart to free them from the stirrups.

As so far described, the grab will operate, when being lowered, in a manner quite similar to the grab described with reference to Figures 1 and 2, that is to say its jaws will swing down and open to their widest extent when the hoisting-and-closing ropes are slackened and the weight is taken by the opening or holding rope acting on the centre pivot of the toggle links 20 and on the bell-cranks 58. During the digging or loading operation, however, the action is different. When the jaws touch the ground the tension in the opening or holding ropes 22 is relieved and the bell-cranks 58 return by gravity to their original position. They may if desired be urged by springs into this position. The weight of the grab thereupon causes the jaws to tilt, and the constraining links 44 slide upwards through the stirrups. These links are of course now convergent upwardly and consequently their inner edges (in which are the notches 50) will bear against the stirrups 48 owing to their weight. Consequently when the notches reach the stirrups they will engage over them and will thereafter be held in engagement by the ensuing tension in the closing-and-hoisting ropes 30. Thus the jaws will be constrained by these links 44 during the closing movement as previously described and the constraint is only removed when tension is applied to the opening or holding ropes 22.

In some cases it may be desired to lower the grab with the jaws separated, but in their constrained position—that is to say with the notches 50 in the constraining links engaged with the stirrups. This is advantageous in that it avoids the risk, which is present when operating in the manner just described, that one of the jaws might not tilt correctly under the weight of the grab when lowered on to uneven ground. In order to enable this to be done two pendulous hooks 62 are pivoted to the head of the grab in such a position that at the end of the opening movement the centre pivot 64 of the toggle links 20 will snap past the hooks and be engaged thereby. The centre pivot will now be unable to descend and therefore the jaws will be held apart. Tension applied to the closing-and-hoisting ropes 30 will therefore tilt the jaws on the arms until the notches re-engage with the stirrups, but will be unable to draw the jaws together. Consequently the grab may be lowered on the closing-and-hoisting ropes 30 with the jaws separated but under constraint.

Naturally, means must be provided for disengaging the hooks from the pivot in order that digging may take place, and this is effected through the medium of the opening or holding ropes 22. It should here to noted that when the arms are spread apart the lower ends of the bell-cranks 58 are incapable of reaching the constraining links. The hooks 62 are provided with a tail 66 projecting horizontally from a spindle 68 to which the hooks are attached and this tail is surmounted by a pivoted weighted arm 70 having an upward extension 71 connected by a link 73 to an upward extension 75 of one of the bell-cranks 58 in such a manner that when this bell-crank is swung as aforesaid by tension in the opening or holding ropes 22 the weight is lifted clear of the tail, but when this tension is relieved the weight drops on to the tail and moves the hooks clear of the pin.

When lowering the grab on the closing-and-hoisting ropes with the buckets under constraint the tension in the opening or holding rope need not be maintained, the hooks being maintained in engagement with the centre pivot 64 by reason of the fact that the tension in the closing-and-hoisting ropes 30 urges the centre joint of the toggle links 20 downwards, thus holding the hooks in engagement with the pivot in spite of the action of the weighted arm 70. When the grab reaches the end of its descent, the tension in the ropes 30 will be relieved whereupon the weighted arm will be effective to disengage the hooks from, and free, the centre pivot of the toggle links. Tension now applied to the closing-and-hoisting ropes 30 will move the buckets together under constraint as previously described.

The relative positions of the pivots of the linkage is preferably such that the jaws begin their closing movement with their bottoms at an angle of about 45° to the horizontal and finish in a nearly horizontal position.

Figure 10:
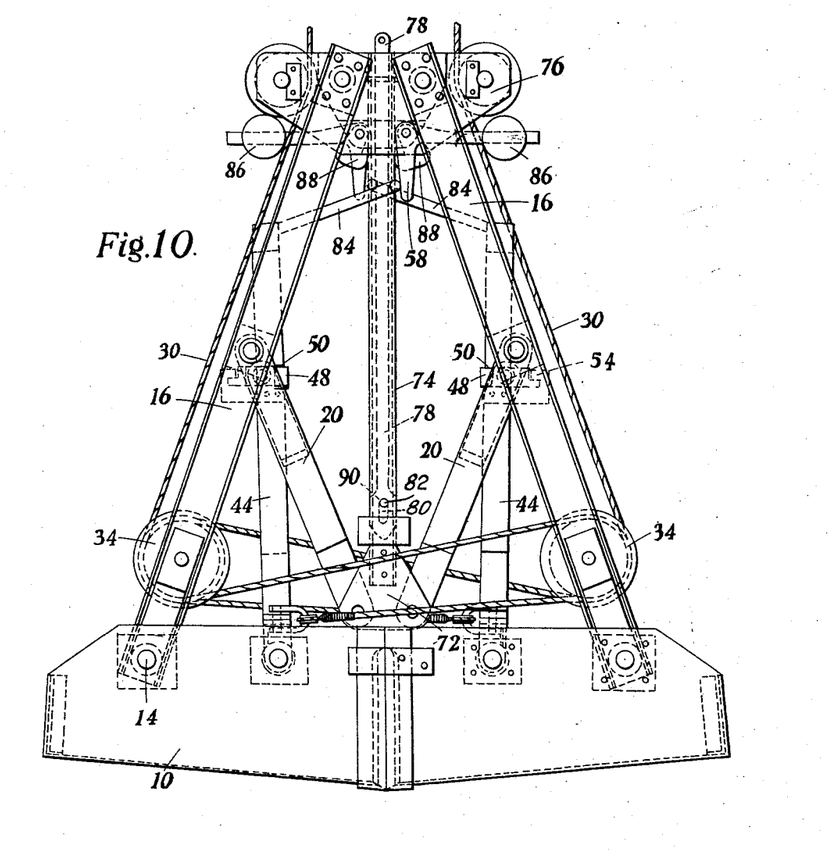
Figures 10 and 11 are side elevations in the closed and open positions respectively of another modified form of grab.
Figure 11:
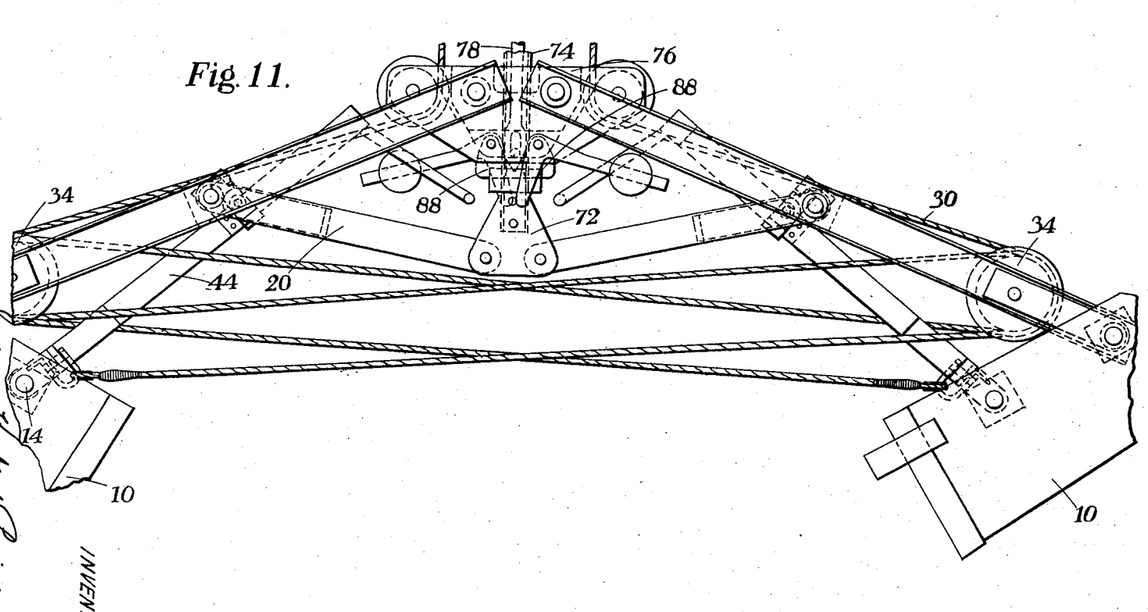
Figure 12:
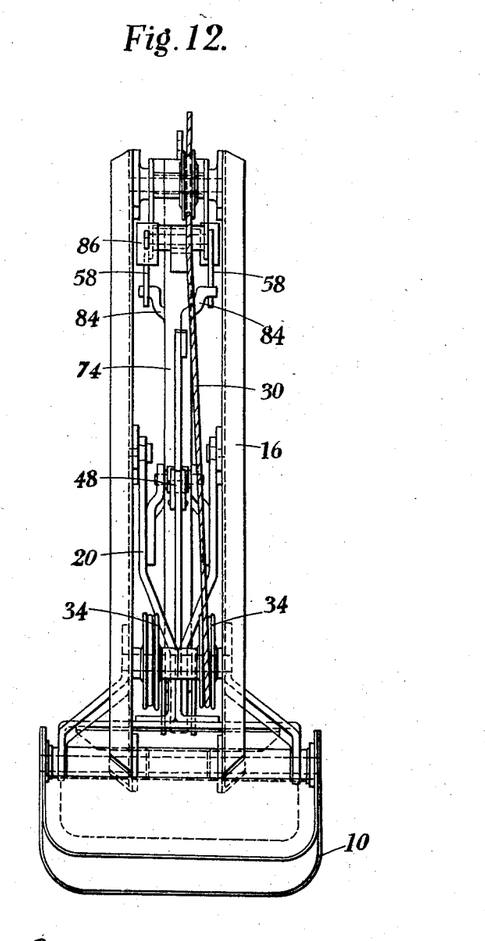
Figure 12 is an end elevation thereof.

The modified grab now to be described with reference to Figures 10, 11 and 12 is arranged so that it can be held on the holding or opening rope during the digging operation with the jaws under constraint, thus enabling the grab to be held at any desired level so that the depth of the digging cut can be positively controlled throughout its extent.

In this modified construction the middle jointing member 72 of the toggle links 20 is fixed to a vertical tube 74 of square section extending upwardly through the grab head 76. A rod 78 sliding within the tube has a slot 80 in its lower end which embraces a pin 82 fixed in the tube, and the opening or holding rope is secured to the upper end of the rod. Tension applied to this rope will raise the rod until the lower end of the slot 80 meets the pin 82, whereupon the tube 74 will be raised, thus straightening the toggle links and opening the jaws. If at the same time the closing-and-hoisting ropes 30 are slackened, the constraining links 44 are released by the bell-cranks 58, acting upon the ends of lateral extensions 84 of the upper ends of the links. The bell-cranks 58 are not operated by the tension in the opening or holding rope as in the grab illustrated in Figures 6 and 7, but by weights 86 attached to their horizontal arms. When the grab is held on the closing-and-hoisting ropes, attached to the links 44 as before, the tension in these ropes keeps the links in their engaged position, raising the weights 86. These weights may if desired be replaced by springs.

When the arms 16 reach the position shown in Figure 11, pendulous hooks 88 pivoted to the grab head enter slots in the sides of the tube 74 just beneath the lower end of the rod 78. These hooks lock the arms 16 in the open position. Tension applied to the closing ropes 30 (without, however, slackening the holding rope) will tilt the jaws 10 upwardly and re-engage the links 44 with the stirrups 48. The grab may then be lowered to the ground.

The lower part of the rod 78 is widened laterally and the edges of the widened part 90 slide in slots in the sides of the tube. The lower extremity of the rod is tapered as shown. When the grab is on the ground the holding rope will allow the rod 78 to fall, thereby causing its lower end to wedge the hooks 88 out of engagement with the tube, thus releasing the toggle links and allowing the closing and digging movement to begin. It should be understood that the hooks 88 and the slots in the tube with which they engage are wider than the lateral edges of the widened part 90 of the rod and the slots in which they travel, the hooks engaging with the shoulders at the meeting points of the two pairs of slots.

As soon as the closing movement has begun the slots in the tube move out of reach of the hooks 88, and therefore tension may now be applied to the holding or opening rope without causing the hooks to be re-engaged with the tube. Moreover, since the levers 58 are weight-operated instead of being operated by the tension in the holding or opening rope, they will not cause the disengagement of the links 44 from the levers 20 when the extensions 84 encounter them during the closing movement. In consequence, the weight of the grab may be taken by the holding or opening rope throughout the digging movement, and the grab may be held at any level, thereby enabling the path of the cutting edges of the jaws to be positively controlled. They may in fact be caused to move along a straight path if desired, which is an important point in such operations as ditch-digging and cleaning.

When the closing movement is completed the parts resume the relative positions shown in Figure 10, the grab is hoisted by continuing to haul in the closing and hoisting ropes, and the jaws 10 swing downwards to discharge the load as soon as these ropes are slackened and the weight is transferred from the closing ropes 30 to the holding rope.

I claim:—

1. A grab-bucket comprising in combination two arms pivotally connected together at their upper ends, two bucket-jaws each hinged to the lower end of one of the arms, grab-operating ropes, a disconnectible linkage connecting each bucket-jaw to the arms and adapted to constrain the jaws angularly in relation to the angle between the two arms, means for uncoupling the linkage and means whereby the linkage may be re-coupled.

2. A grab-bucket comprising in combination two arms pivotally connected together at their upper ends, two bucket-jaws each hinged to the lower end of one of the arms, grab-operating ropes, a disconnectible linkage connecting each bucket-jaw to the arms and adapted to constrain the jaws angularly in relation to the angle between the two arms means for automatically uncoupling the linkage and means permitting it to be re-coupled in response to changes in tension of the grab-operating ropes.

3. A grab-bucket comprising in combination two arms pivotally connected together at their upper ends, two bucket-jaws each hinged to the lower end of one of the jaws, a pair of downwardly-converging toggle links connecting together the two arms, two constraining links each pivoted to one of the bucket-jaws at its lower end, two detents, one on each constraining link, adapted to engage with the corresponding toggle link by an inward movement, two closing-and-hoisting ropes each connected to one of the constraining links and two pulleys one on each arm around which the rope from the opposite constraining link is passed, said pulleys being so situated that tension in the said ropes tends to pull the constraining links inwards and to swing the bucket-jaws upwardly about their hinges.

4. The invention of claim 3 in combination with a pulley on the middle joint of the toggle links, a pair of levers co-operating with the constraining links and closing ropes connected to said levers and passed round said pulley whereby tension in said ropes causes the levers to press the constraining links outwardly to disengage the detents from the toggle links.

5. The invention of claim 3 in combination with weight-operated means co-operating with the constraining links when the grab is closed to press said links outwardly to disengage the detents from the toggle links.

6. A grab-bucket comprising in combination two arms pivotally connected together at their upper ends, two bucket-jaws each hinged to the lower end of one of the arms, grab-operating ropes, a linkage connecting each bucket-jaw to the arms and comprising a pair of downwardly-converging toggle links connecting together the two arms and a pair of constraining links each connecting one of the bucket-jaws to the corresponding toggle link, and detent means automatically engaging the middle joint of said toggle links as said joint approaches its uppermost position.

7. The invention of claim 3 in combination with detent means automatically engaging the middle joint of said toggle links as said joint approaches its uppermost position.

8. A grab-bucket comprising in combination two arms pivotally connected together at their upper ends, two bucket-jaws each hinged to the lower end of one of the arms, grab-operating ropes, a linkage connecting each bucket-jaw to the arms, and comprising a pair of downwardly-converging toggle links connecting together the two arms and a pair of constraining links each connecting one of the bucket-jaws to the corresponding toggle link, detent means automatically engaging the middle joint of said toggle links as said joint approaches its uppermost position, and weight-operated means tending to disengage said detent means from said joint.

9. A grab-bucket comprising in combination two arms pivotally connected together at their upper ends, two bucket-jaws each hinged to the lower end of one of the arms, grab-operating ropes, a linkage connecting each bucket-jaw to the arms, and comprising a pair of downwardly-converging toggle links connecting together the two arms and a pair of constraining links each connecting one of the bucket-jaws to the corresponding toggle link, detent means automatically engaging the middle joint of said toggle links as said joint approaches its uppermost position, weight-operated means tending to disengage said detent means from said joint, and an operative connection between said weight-operated means and one of said operating ropes whereby tension in said rope renders said means inoperative to disengage the detent means.

10. A grab-bucket comprising in combination two arms pivotally connected together at their upper ends, two bucket-jaws each hinged to the lower ends of one of the arms, a pair of downwardly-converging toggle links connecting together the two arms, two constraining links each connecting one of the bucket-jaws to the corresponding toggle links, a pulley on the middle joint of the toggle links, an opening rope connected to the grab-head and passing around said pulley, detent means automatically engaging the middle joint of said toggle link as said joint approaches its uppermost position, weight-operated means tending to disengage said detent means from said joint, and an operative connection between said weight-operated means and said opening rope whereby tension in said rope renders said means inoperative to disengage the detent means.

11. A grab bucket comprising in combination two arms pivotally connected together at their upper ends, two bucket-jaws each hinged to the lower end of one of the arms, grab-operating ropes, a pair of downwardly-converging toggle links connecting together the two arms, two constraining links each pivoted to one of the bucket-jaws at its lower end, and each detachably connected at its upper end to one of the toggle links intermediate its ends, means for disconnecting the constraining links from the toggle links and means enabling said links to be reconnected thereto.

12. A grab bucket comprising in combination two arms pivotally connected together at their upper ends, two bucket-jaws each hinged to the lower end of one of the arms, grab-operating ropes, a pair of downwardly-converging toggle links connecting together the two arms, two constraining links each pivoted to one of the bucket-jaws at its lower end, and each detachably connected at its upper end to one of the toggle links intermediate its ends, means for disconnecting the constraining links from the toggle links as a consequence of tension in one of the grab-operating ropes, and means enabling said links to be reconnected thereto.

13. A grab bucket comprising in combination a link system, two opposed jaws pivoted to said link system about axes situated near the outer ends of said jaws, means for moving the jaws towards and away from one another, and means for maintaining the jaws in a load-retaining position, said means being releasable to permit the jaws to swing down freely about the axes aforesaid under the influence of gravity independently of the means for moving the jaws towards and away from one another.

14. A grab bucket comprising in combination a link system, two opposed jaws pivoted to said link system about axes situated near the outer ends of said links and normally connected at other points to said link system so as to constitute a part thereof and to be constrained thereby, means for moving the jaws towards and away from one another, means for freeing said jaws from constraint by said link system and means enabling said constraint to be re-established at will.

In witness whereof I hereunto subscribe my name, this 16th day of July, 1930.

S. H. PRIESTMAN.